United States Patent [19]

Uffenheimer et al.

[11] Patent Number: 4,863,066

[45] Date of Patent: Sep. 5, 1989

[54] SYSTEM FOR DISPENSING PRECISELY METERED QUANTITIES OF A FLUID AND METHOD OF UTILIZING THE SYSTEM

[75] Inventors: Kenneth F. Uffenheimer, Pelham; Kent M. Negersmith, Carmel, both of N.Y.

[73] Assignee: Technicon Instruments Corporation, Tarrytown, N.Y.

[21] Appl. No.: 277,274

[22] Filed: Nov. 29, 1988

Related U.S. Application Data

[63] Continuation-in-part of Ser. No. 869,680, Jun. 2, 1986, abandoned.

[51] Int. Cl.⁴ .............................................. B67B 7/00
[52] U.S. Cl. ...................................... 222/1; 222/334; 222/571; 417/318
[58] Field of Search .................... 222/1, 249, 250, 251, 222/255, 309, 333, 334, 372, 386.5, 444, 445, 571; 417/318, 395, 390, 383

[56] References Cited

U.S. PATENT DOCUMENTS

| | | | |
|---|---|---|---|
| 862,867 | 8/1907 | Eggleston | 417/472 |
| 1,984,296 | 12/1934 | Witter | 222/334 X |
| 2,388,662 | 11/1945 | Anderson et al. | 222/309 X |
| 2,779,506 | 1/1957 | Gajda | 222/571 |
| 3,227,314 | 1/1966 | Porter et al. | 222/334 X |
| 3,227,325 | 1/1966 | Bates | 222/309 |
| 3,484,024 | 12/1969 | Jones et al. | 222/571 X |
| 3,831,821 | 8/1974 | Doyen | 222/444 X |
| 4,055,281 | 10/1977 | Rosen et al. | 222/334 X |

FOREIGN PATENT DOCUMENTS

| | | | |
|---|---|---|---|
| 945469 | 4/1949 | France | 222/334 |
| 718711 | 2/1980 | U.S.S.R. | 222/334 |

Primary Examiner—Kevin P. Shaver
Attorney, Agent, or Firm—Scully, Scott, Murphy & Presser

[57] ABSTRACT

A fluid delivery system for dispensing precisely metered quantities of a fluid, and more particularly, a fluid delivery system incorporating a diaphragm pump for effectuation of the precise control over the dispensing of a metered quantity of the fluid through the formation of a fluid flow-occluding air bubble at the point of discharge inhibiting the formation of droplets tending to adversely influence the accuracy of the system. Also disclosed is a method for delivering and dispensing precisely metered quantities of a fluid through the utilization of the system.

15 Claims, 1 Drawing Sheet

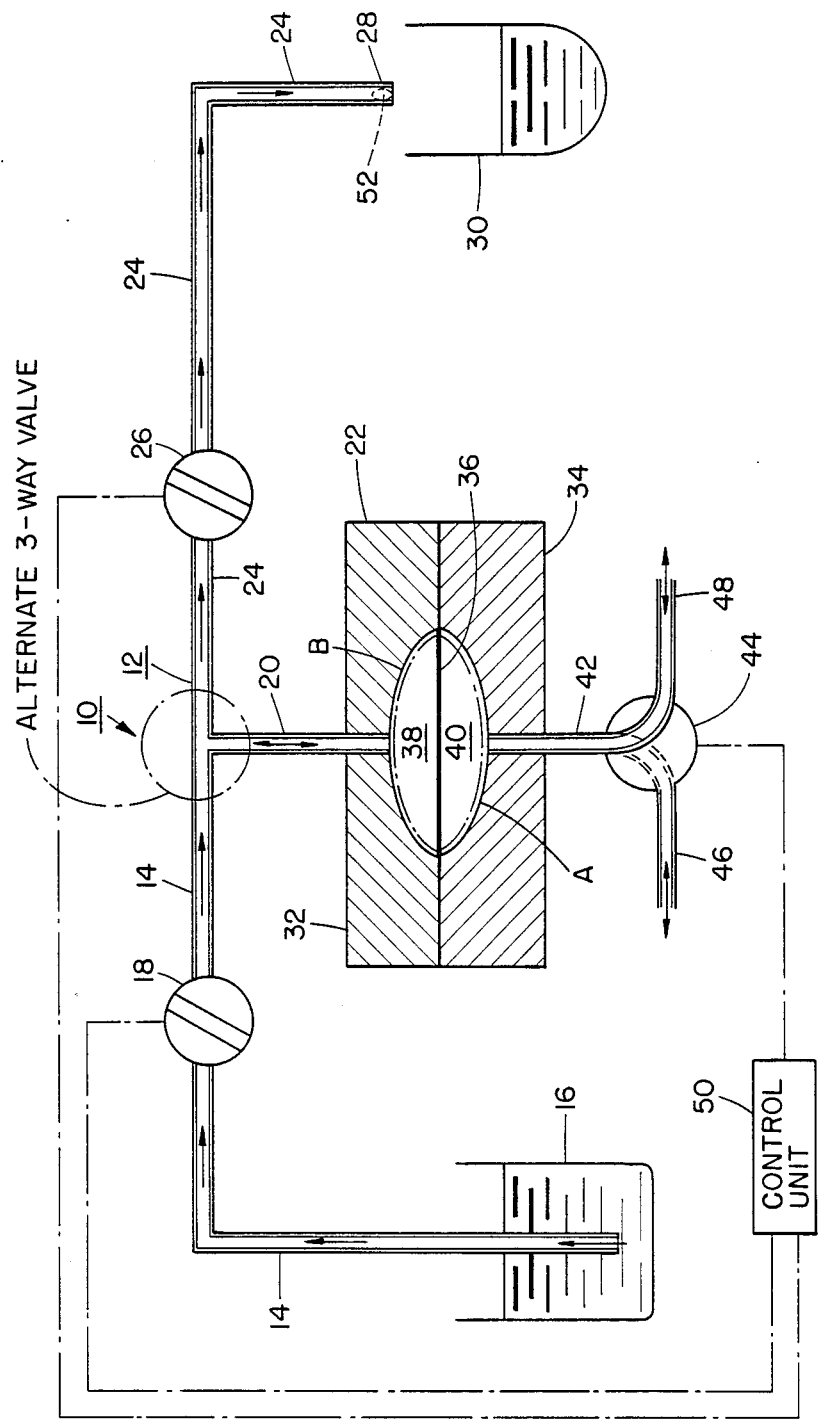

SYSTEM FOR DISPENSING PRECISELY METERED QUANTITIES OF A FLUID AND METHOD OF UTILIZING THE SYSTEM

CROSS-REFERENCE TO RELATED PATENT APPLICATIONS

This application is a continuation-in-part patent application of Ser. No. 869,680; filed June 2, 1986, now abandoned.

BACKGROUND OF THE INVENTION

1. Field of the Invention

The present invention relates to a fluid delivery system for dispensing precisely metered quantities of a fluid, and more particularly, relates to a fluid delivery system incorporating a diaphragm pump for effectuation of the precise control over the dispensing of a metered quantity of the fluid through the formation of a fluid flow-occluding air bubble at the point of discharge inhibiting the formation of droplets tending to adversely influence the accuracy of the system. The invention further relates to a method for delivering and dispensing precisely metered quantities of a fluid through the utilization of the system pursuant to the invention.

For the delivery and the dispensing of precisely metered quantities of fluids; for instance, such as reagents which are employed in chemical reactions, fluids for instrumentation devices and methods carrier fluids and the like, it is frequently necessary that the quantities of the fluid which are delivered by the dispensing system are dispensed or dosed in accurate measures when conveyed from a supply of the fluid to a dispensing nozzle, which may be a component of a probe. The degree of dispensing accuracy which is frequently necessary in obtaining the required metered quantity or dosage of the fluid, for example, to an accuracy of within a single droplet of the fluid, not only depends upon the fluid advancing or pumping action of the fluid delivery system, but also upon the tip geometry and material of the dispensing nozzle or probe, the surface tension between the fluid and the therewith contacting material of the dispensing nozzle, the viscosity of the fluid, the flow velocity of the fluid, and upon occasion, the type of reagents from which the fluid is constituted.

2. Discussion of the Prior Art

Although numerous fluid delivery methods and systems are currently known in the technology which relates to the dispensing of extremely precisely metered quantities of various types of fluids, none of these prior art are adapted to provide the necessary degree of precision or dosing accuracy in the dispensing of the specific fluids, for example such as reagents employed in chemical sampling or reactions, or instrumentation fluids, which must be dispensed and/or added to other ingredients to thereby eliminate any kind of error in calibrating the dispensed volume of the fluid.

Thus, Fritsch U.S. Pat. No. 4,430,048 discloses a diaphragm pump in which a flexible diaphragm separates the pump interior into a fluid delivery chamber and a working chamber, and wherein predetermined quantities of a fluid are adapted to be aspirated into and discharged from the delivery chamber in response to alternating pressures being imparted to the working chamber. The alternating or reversing changes in pressure acting on the working chamber will enable the fluid to be dispensed from the delivery chamber in response to the displacement of its diaphragm through a suitable outlet having a non-return valve therein. Although the diaphragm pump and the fluid delivery system which is provided thereby, as described in this publication, facilitates the dispensing or dosing of substantially uniform quantities of a fluid, the system described therein is not adapted to allow for the extremely precise metering of fluids through the formation of an air bubble at the discharge of the system, which will inhibit the formation of fluid droplets at the discharge end of the system tending to adversely affect the accuracy in the dispensing or metered dosing of the fluid.

Hetz U.S. Pat. No. 3,767,326 discloses a control system for regulating the volume of a fluid which is adapted to be dispensed through the reciprocatory action of a diaphragm pump. However, this known system is designed to primarily facilitate the varying of a quantity of fluid being dispensed therefrom during each cycle of operation, in response to the operation of a bypass valve which is actuated by a control circuit. There is no disclosure of any system incorporating a diaphragm pump and a method of utilization thereof to form an occluding air bubble at the discharge end which will facilitate the dispensing of precisely metered or dosed quantities of a fluid at a degree of delivery accuracy required for the most demanding and delicate chemical reactions, and which would inhibit the formation of any residual fluid droplets at the discharge tending to adversely influence the accuracy of dispensed quantities of fluid.

Surre U.S. Pat. No. 2,662,478 discloses a diaphragm pump and compressor arrangement, through which metered quantities of a fluid may be aspirated and then dispensed responsive to the reciprocating action of a diaphragm in a pump subjected to alternating pressure and vacuum being applied to the working chamber of the diaphragm pump. Although this patent describes the basic principle of dispensing a fluid through the intermediary of a diaphragm pump, there is no disclosure of a system providing for the necessary accuracy in dispensing metered quantities of a fluid through the formation of an occluding air bubble at the discharge of the system.

Schmechtig U.S. Pat. No. 4,269,906 describes a pump device in which pulsating pressures in the form of pressure waves are applied to a membrane, causing the membrane to be displaced from the outlet of a conduit and to facilitate the filling of a pump chamber with a certain quantity of fluid and thereafter dispensed from the device by a reversal of pressure. As in the other publications, although this pump device employs the basic principle of a diaphragm pump, there is no utilization nor disclosure of a system allowing for the precision metering or dosed delivery of quantities of a fluid with the formation of an occluding air bubble which will prevent the flow of any residual fluid droplets causing the minutest deviation from the desired dispensed quantity tending to adversely affect the accuracy of the system.

Other diaphragm pumps and systems for dispensing predetermined quantities of fluids or the like are, respectively, disclosed in Kiffer, et al. U.S. Pat. Nos. 2,871,789; Harper 2,308,974; Telford, et al. 3,269,318; Kitsnik 4,439,112; Finger 3,692,433; Di Vette 2,954,738; Bruggeman 3,930,756; Ruth 3,318,324; and Beer 3,556,684, however; none of which provide for the desired or necessary degree of accuracy in dispensing dosages of fluids of the type considered herein.

SUMMARY OF THE INVENTION

Accordingly, in order to meet the needs of the fluid or liquid delivery and dispensing technology by the provision of a system and method for the discharge of precisely metered or accurately dosed quantities of a fluid, especially a fluid which is employed in delicate chemical reactions or the like, instrumentation fluids or carrier fluids demanding precision within a droplet of the fluid, pursuant to the invention there is provided a system including a flow conduit communicating between a supply of the fluid, such as a chemical reagent, and a reaction chamber, having a metering pump interposed in the system for accurately dispensing precisely metered quantities of the fluid from a discharge nozzle or chemical sample probe. The metering system, in this instance, contemplates the provision of a pair of spaced actuating valves interposed in the conduit, intermediate which valves there connects a conduit leading to the pump which in the form of a diaphragm pump having an internal delivery chamber for the fluid and a working chamber separated therefrom by means of a flexible diaphragm. The working chamber is alternatingly subjected to a vacuum and to a pressure so as to intermittently aspirate a predetermined quantity of fluid from the fluid supply, with the aspirated fluid quantity being commensurate with the internal volume of the diaphragm pump based on the displacement of the diaphragm pump responsive to a vacuum applied to the working chamber, and with the fluid aspirated into the interior of the diaphragm pump being expelled therefrom through lifting the vacuum and applying superatmospheric pressure to the working chamber which is higher than the pressure in the pump delivery chamber so as to cause the fluid expelled from the pump to be conducted to and dispensed from a discharge nozzle of the system.

In response to the operation of a suitable control arrangement, during the aspirating cycle of the diaphragm pump when the fluid is withdrawn from the supply, one of the valves, which is interposed in a conduit section intermediate the diaphragm pump and the discharge nozzle, is maintained in a closed position, whereas the other valve which is interposed in the conduit section between the supply source for the fluid and the diaphragm pump, is maintained in an open portion so as to facilitate the fluid to be aspirated into the delivery chamber of the diaphragm pump. Concurrently, the working chamber of the pump is subjected to vacuum, thereby allowing the fluid to fill the pump interior. Upon the working chamber of the diaphragm pump then being subjected to superatmospheric pressure, responsive to the actuation of a suitable valve device, such as a three-way valve which is selectively connectible to a source of vacuum and a source of a pressurized medium, such as air or a hydraulic fluid, the valve which is interposed in the conduit section between the supply source for the fluid and the diaphragm pump is set into a closed position, whereas the valve which is interposed in the conduit section between the diaphragm pump and the discharge nozzle is maintained in an open position so as to allow for a quantity of fluid corresponding to the displacement volume of the diaphragm pump to be ejected from the nozzle.

Inventively, through suitable correlation of parameters among the tip geometry and material of the fluid discharge nozzle, volume of fluid pumped, viscosity of fluid being pumped and its flow velocity, and surface tension present between fluid and conduit wall, an air bubble is formed in the discharge end of the nozzle at the termination of the fluid displacement stroke of the diaphragm pump, thereby occluding any droplets of fluid to be dispensed from the nozzle, while concurrently providing visual indication of the proper pumping action of the fluid dispensing system.

Accordingly, it is a primary object of the present invention to provide a novel and improved system for dispensing precisely measured quantities of a fluid.

A more specific object of the present invention resides in the provision of a novel system of the type described for dispensing precisely metered quantities or dosages of fluid, which employs a diaphragm pump which will facilitate the formation of an occluding air bubble at the fluid discharging tip of a dispensing nozzle as a visual indication over the accuracy of the system in the dispensing of the accurately dosed quantity of fluid.

Yet another object of the present invention resides in the provision of a fluid dispensing system of the type described, incorporating the novel diaphragm pump and a valving arrangement through which the occluding air bubble is formed at the discharge end or tip of a nozzle of the conduit which will inhibit the egress of any residual droplets of fluid from the discharge nozzle, and in which the air bubble serves both as a visual monitor and precision enhancer in preventing a variable volume droplet of the fluid from remaining on the tip of a probe formed by the nozzle at termination of the fluid dispensing operation of the system at each pumping cycle.

Another object of the present invention resides in the provision of a method for dispensing accurately metered or dosed quantities of a fluid, employing the fluid dispensing system pursuant to the invention.

BRIEF DESCRIPTION OF THE DRAWINGS

The foregoing and other advantages, features and objects of the invention may now be readily ascertained from the following detailed description of a preferred embodiment of a novel fluid dispensing system, taken in conjuction with the accompanying single figure of the drawing schematically illustrating the system.

DETAILED DESCRIPTION

Referring in detail to the drawing, there is schematically illustrated a system 10 for the dispensing of precisely metered quantities or dosages of a fluid.

The system 10 includes a flow conduit 12 which consists of a first conduit section 14 having a fluid inlet end thereof communicating with a supply receptacle or container 16 for a fluid which is to be dispensed in measured doses. The fluid may be a liquid which is employed in chemical reactions, an instrumentation fluid, a carrier fluid, or any liquid which must be dispensed in extremely accurately dosed or calibrated quantities. Although the receptacle 16 is illustrated as being an open container, it may be readily apparent to one skilled in the art that the receptacle 16 may be of a closed or sealed construction to avoid the contaminating of the fluid contents from external sources.

A valve 18, which preferably is a non-return valve, is interposed in the conduit section 14 and is arranged ahead or upstream of the interconnection of the conduit section 14 with a conduit 20 which communicates with a diaphragm pump 22. Additionally, the conduit section 14 and conduit 20 communicate at their juncture with a further conduit section 24 of conduit 12 in which there is interposed a second valve 26, preferably also a non-return valve. At its discharge end the conduit section 24 is provided with a suitable discharge nozzle 28 or tip section through which the fluid may be dispensed in accurately metered doses into a suitable receptacle or reaction chamber 30, herein diagrammatically illustrated as an open beaker.

The diaphragm pump 22, which essentially comprises assembled and fastened pump body portions 32 and 34, having a flexible diaphragm 36 sealingly clamped therebetween, and with a first concavely-shaped cavity constituting a fluid delivery chamber 38 being formed in the pump body portion 32, and a second concavely-shaped cavity constituting a working chamber 40 formed in the pump body portion 34, which are separated by the diaphragm 36. The delivery chamber 38 is in open communication with the conduit 20, and resultingly with conduit sections 14 and 24 of conduit 12; whereas the working chamber 40 of the pump 22 is in open communication with a conduit 42 having a suitable three-way valve 44 interposed therein which is adapted to be selectively connected with a source of vacuum or subatmospheric pressure (not shown) through conduit 46, or a supply of a pressurized medium, such as compressed air (not shown) through a conduit 48. The interrelated functioning of the valves 18, 26 and 44 for the operation of the fluid dispensing system as may be implemented by means of a suitable control unit 50, which may be a mechanical, electromechanical, electrical or electronically programmable control device in which the operating cycle of the fluid dispensing system may be programmed pursuant to pregiven parameters and requisite operating conditions.

The operation of the fluid dispensing system 10 is essentially as set forth hereinbelow:

With the conduit section 14 and the conduit section 24 having been initially filled with fluid from the receptacle 16, and with conduit 20 and pump delivery chamber 38 also filled with fluid so as to completely expel of any air contained in the fluid dispensing system 10 prior to the accurately dosed discharge of fluid from the dispensing orifice or nozzle 28, the valve 44 is actuated by the control unit 50 so as to relieve any pressure in conduit 48. Concurrently, subatmospheric pressure or vacuum is applied to conduit 46 causing the flexible diaphragm 36 to be pulled into surface contact with the concave bottom surface of the working chamber 40. The control unit 50 is then activated so as to actuate the valve 18 into an open position while causing closing of the valve 26. This will cause fluid to be aspirated from the receptacle 16 and to flow through conduit sections 14 and valve 18 through conduit 20 and thereby fill the entire interior volume of the diaphragm pump 22 defined by the combined delivery chamber 38 and the working chamber 40. Upon the interior volume of the diaphragm pump 22 having been filled with fluid, the control unit 50 closes the valve 18 and opens valve 26, and in lieu of vacuum through conduit 46, a pressurized medium is applied through conduit 48 and conduit 42 to the bottom A of the working chamber 40 and diaphragm 36, displacing the diaphragm 36 into an upward position against the bottom B of the cavity of the delivery chamber 38. This will cause a volume of fluid commensurate with the volume of combined chambers 38 and 40 to be forced upwardly through the conduit 20 and into conduit section 24 in the direction of the arrows defining the flow of the fluid within the system and to be ejected through the dispensing tip or nozzle 28 into the reaction chamber or beaker 30. The control unit 50 then closes the valve 26, whereupon the termination of the motion of the fluid; in essence, the completion of the dispensing stroke and the inertia of the fluid itself, causes the formation of a fluid flow-occluding air bubble 52 within the nozzle or tip 28, thereby inhibiting the egress of any residual droplets of fluid from the conduit section 24 into the receptacle or reaction chamber 30. This function of the occluding air bubble 52 as a visual monitor and a dispensing precision enhancer in preventing any variable volume droplet of fluid from remaining on the probe tip or discharge nozzle 28 upon completion of each sequence in the dispensing operation, will prevent any deviations in the volume or doses of the dispensed fluid. Furthermore, prevented is the formation of any droplet which, in the absence of the occluding air bubble 52, could conceivably be expelled during movement of the nozzle when employed as a probe, or could partially or fully evaporate so as to generate additional dispensing errors by the fluid delivery system.

Thereafter, the entire fluid dispensing sequence is repeated for the number of required accurately dosed quantities of the fluid which must be dispensed from the system.

Generally, inasmuch as the formation of the fluid flow-occluding air bubble 52 and the resultant degree of precision in the dispensing of the quantities or doses of fluid from the system depends upon interrelated parameters of the tip geometry and material of the nozzle 28, the pump volume, viscosity, flow velocity and type of fluid, pursuant to one specific example of the fluid dispensing system 10, in which the amount of pumped fluid for each operating cycle would be within the range of about 0.10 ml and 10.0 ml, preferably 0.10 ml to 1.0 ml, but is not limited thereto, and with a standard droplet being generally about 0.05 ml, this droplet would represent an appreciable error in the quantity of dispensed fluid.

Furthermore, of significance is the surface tension of the fluid relative to the internal flow diameter of the nozzle, for example 0.010 to 0.080 in., calculated as a function of the other parameters, as set forth hereinbelow, with the tip or nozzle 28 being preferably constituted of either plastic or stainless steel, and the fluid having a viscosity within the range of about 0.5 to 5 centipoises, but not limited thereto, and a flow rate of from about 0.05 ml/sec. to about 10 ml/sec., but not limited thereto.

The surface tension can be calculated as being a function in dependence upon the remaining parameters, considered as a mathematical model defining such surface tension in physical terms.

The derivation of the above-mentioned mathematical model, based upon the application of the Newton's Second Law to fluid flow through a nozzle after the act of dispensing, is presented hereinbelow in Appendix 1. The main result is that, in order to provide the occluding air bubble at the tip of the probe as a visual monitor and a dispensing precision enhancer, the fluid acceleration a should exceed a certain value A which is a function of six parameters as set forth hereinbelow.

$$A = \frac{\sigma}{\rho d l} + \frac{128 v Q}{\pi d^4} + g \frac{l_1}{l}$$

wherein
- $\sigma$ = surface tension,
- $\rho$ = density of fluid,
- $\nu$ = kinemtic viscosity of fluid,
- Q = flow rate,
- d = diameter of flow conduit section 2,
- l = length of flow conduit section 24,
- $l_1$ = length of the vertical part of flow conduit section 24,
- g = gravity.

The above acceleration parameters are related to the aforementioned parameters as follows: (1) tip geometry is characterized by diameter d, (2) material of the nozzle influences the value of surface tension $\sigma$, (3) volume of fluid pumped is equal to flow rate Q multiplied by the interval of time during which there forms an occluding bubble, (4) viscosity of fluid is characterized by the value of $\nu$, (5) flow velocity equals to flow rate divided by conduit cross-section area, (6) surface tension is characterized by the value of $\sigma$.

If surface tension is decrease, for instance, by means of the addition of a surfactant, the value of A would correspondingly decrease, which means the smaller acceleration would be sufficient for the formation of the occluding bubble.

It is possible to obtain a few other corollaries from the above mathematical model; namely: (1) the smaller the diameter and length of the conduit, the larger is the needed acceleration, (2) using heavier fluids the acceleration is decreased, (3) the more viscous a fluid, the larger is the needed acceleration; and so forth Employing the mathematical model, anyone skilled in the art may select the proper acceleration providing the apparatus with the formation of the occluding bubble at tip of the probe, thus enabling it to enhance the precision in dispensing the metered quantities of fluid.

A physical example of the calculation for the acceleration is set forth hereinbelow in Appendix 2.

APPENDIX 1

Derivation of Mathematical Model

Considering the portion of fluid contained in the conduit section 24 at an instant of time after the closure of valve 26. Applying the second Law of Newton, the product of fluid portion mass m by its acceleration a is equal to the sum of forces. The latter are: (1) the surface tension force $F_\delta$ applied at the tip of probe, (2) the viscous friction force $F_\mu$ applied at the inner surface of conduit section 24, (3) the weight of fluid $F_\omega$.

$$ma=F_\delta+F_\mu+F_\omega \quad (1);$$

where $$m=\rho v=\rho\pi d^2 l/4 \quad (2);$$

$$F_\delta=\delta\pi d \quad (3);$$

$$F_\mu=\tau\pi dl \quad (4);$$

$$F_\omega=\rho g\pi d^2 l_1/4 \quad (5);$$

The shearing stress $\tau$ is correlated with the pressure gradient along the fluid portion in the conduit section 24, by the expression:

$$\tau S=a\pi A \quad (6);$$

where

S=conduit section surface area

A=conduit section cross-sectional area

Since $S=\pi d1$ and $A=\pi d/^2/4$ therefore $$\tau = \Delta\rho \frac{d}{4l}; \quad (7)$$

The flow for the apparatus, as a result, is usually laminar. For a steady state of a laminar flow within a tube, the Poiseuille's law is applicable, which relates the pressure gradient to flow rate $$\Delta\rho = 128 \frac{\mu l}{\pi d^4} Q; \quad (8)$$

Combining the equations (4) and (6)–(8), there is obtained $$F\mu = 32 \frac{\mu l}{d^2} Q; \quad (9)$$

Rewriting Equation (1) now as $$\rho \frac{\pi d^2 l}{4} \alpha = \sigma\pi d + 32 \frac{\mu l}{d^2} Q + \frac{\rho g\pi d^2 l_1}{4}; \quad (9)$$

or $$\alpha = \frac{4\sigma}{\rho\mu l} + \frac{128\nu Q}{\pi d^4} + g\frac{l_1}{l}. \quad (10)$$

Denominating the right hand side part of the Equation (10) as A, one may state that if a≧A, the inertia force would be greater than the sum of holding forces $F_\delta+F_\mu+F_\omega$. Under the action of the inertia force, a portion of the fluid would then squirt out, forming a vacuum between the valve 26 and the rest of the fluid. After that, under the action of the pressure gradient between atmospheric pressure and the vacuum, the fluid would be pushed back into the probe, thus forming an occluding bubble at the tip of the probe.

APPENDIX 2

The Numerical Example

The values of parameters listed below pertain to the apparatus pursuant to a specific physical application, but not limited thereto; in this example the fluid being water at 80° F.

$\delta$=0.005 lb/ft $\rho$=62.4 lb/ft$^3$ d=0.05′=/604 ft

1=1 ft $1_1$1=0

Q=0.5 ml/sec=0.0000018 ft$^3$/sec $\nu$=0.9×10$^{-5}$ ft$^2$/sec g=32.174 ft/sec$^2$ Performing calculations by means of Equation (10), there is determined the acceleration threshold as a≧0.08 ft/sec$^2$. This means that at accelerations of diaphragm pump membrane of greater than 0.08 ft/sec; at for instance, 0.2 ft/sec$^2$ or 0.5 ft/sec$^2$, the occluding bubble will form and the dispensing precision will resultingly increase.

From the foregoing mathematical model set forth in Appendix 1, and the physical application thereof to an actual construction embodiment of the invention as defined in the present specification and as set forth in Appendix 2, it becomes readily apparent that one of average skill in this particular technology would be able to derive the necessary parameters including the surface tension between the fluid and the conduit wall sections to enable the formation of the occluding bubble in an optimum manner.

Pursuant to a modification of the inventive system, instead of the arrangement of valves 18 and 26 in the respective conduit sections 14 and 24, it is possible to contemplate the utilization of a single three-way valve in the T-connection formed by the juncture of conduit sections 14, 24 and conduit 20, as illustrated by the phantom-lines in the drawing, and which is operated by the control unit 50.

It is also possible to contemplate the ganging or grouping of a plurality of pumps of varying configurations, employing common components such as pump bodies, diaphragms, valves, conduits and fluids to provide a compound fluid delivery system on an extremely cost-effective basis.

While there has been shown and described what is considered to be a preferred embodiment of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A fluid delivery system for dispensing precisely metered quantities of a fluid of a predetermined viscosity, comprising fluid supply means; pump means; a conduit interconnecting said fluid supply means and pump means; a first valve in said conduit positioned intermediate said fluid supply means and pump means; a nozzle for discharging said fluid from said system; a further conduit connecting said nozzle with said pump means and with said conduit; a second valve in said further conduit; said pump means comprising a diaphragm pump having a flexible diaphragm separating the interior of said pump into a fluid delivery chamber communicating with said conduit means and said further conduit intermediate said first and second valves, and into a working chamber communicating with said selective pressure applying means; means for selectively applying a vacuum and a superatmospheric pressure to said pump means; and control means operatively interconnecting said first and second valves and said selective pressure applying means for aspirating predetermined quantities of fluid from said fluid supply means through said conduit to said pump means and thereafter convey said quantities of fluid from said pump means to said nozzle and wherein a correlation in the physical relationship between the properties of the fluid and the internal flow diameter and material of said nozzle consisting of the parameter of (1) the tip geometry of said nozzle; (2) the material of said nozzle; (3) the volume of fluid pumped, (4) the viscosity of the fluid being pumped; (5) the flow velocity of said fluid; and (6) the surface tension between the fluid and said conduit causes the formation of a fluid flow-occluding air bubble in said nozzle upon termination of discharge of fluid from said nozzle so as to inhibit discharge of residual droplets of said fluid.

2. A fluid delivery system as claimed in claim 1, wherein said diaphragm pump aspirates said fluid from said fluid supply means and conducts a quantity of said fluid to said nozzle commensurate with the combined volume of said delivery and working chambers.

3. A fluid delivery system as claimed in claim 1, wherein said first and second valves each comprise a non-return valve.

4. A fluid delivery system as claimed in claim 1, wherein said selective pressure applying means comprises a three-way valve for selectively connecting the working chamber of said diaphragm pump to a source of vacuum and to a source of a pressurized medium.

5. A fluid delivery system as claimed in claim 4, wherein said pressurized medium comprises compressed air.

6. A fluid delivery system as claimed in claim 4, wherein said pressurized medium comprises a hydraulic fluid.

7. A fluid delivery system as claimed in claim 1, wherein said control means maintains said first valve in an open fluid flow condition and said second valve in a flow blocking condition when said working chamber is subjected to a vacuum by said selective pressure applying means for aspirating said quantity of fluid from said fluid supply means into said diaphragm pump.

8. A fluid delivery system as claimed in claim 1, wherein said control means maintains said first valve in a flow blocking condition and said second valve in an open fluid flow condition when said working chamber is subjected to superatmospheric pressure by said selective pressure applying means to eject a predetermined quantity of fluid from said discharge nozzle and to cause the formation of said flow-occluding air bubble in said nozzle.

9. A fluid delivery system as claimed in claim 1, wherein said first and second valves comprise a single three-way valve at the juncture of said conduits.

10. A method for the dispensing of precisely metered quantities of a fluid of a predetermined viscosity, comprising pumping quantities of a fluid from a fluid supply through a conduit towards a discharge nozzle; effecting said pumping by selectively applying a vacuum and a superatmospheric pressure to a fluid pump an controlling the flow of said fluid by operatively interconnecting a first and second valve and said selective pressure application for aspirating predetermined quantities of fluid from said fluid supply to a pumping arrangement, said fluid pumping arrangement including a diaphragm pump having a flexible diaphragm, said diaphragm separating said pump into a fluid delivery chamber communicating with said conduit intermediate said first and second valves, and into a working chamber responsive to the application of said selective pressure, said diaphragm pump aspirating said fluid from said fluid supply and conducting a quantity of said fluid to said nozzle commensurate with the combined volume of said delivery and working chambers; and thereafter conveying said fluid quantities from said pumping arrangement to said nozzle and wherein a correlation in the physical relationship between the properties of the fluid and the internal flow diameter and material of said nozzle consisting of the parameter of (1) the tip geometry of said nozzle; (2) the material of said nozzle; (3) the volume of fluid pumped; (4) the viscosity of the fluid being pumped; (5) the flow velocity of said fluid; and (6) the surface tension between the fluid and said conduit causes the formation of a fluid flow-occluding air bubble in said nozzle upon termination of discharge of fluid from said nozzle to inhibit discharge of residual droplets of said fluid.

11. A method as claimed in claim 10, comprising applying a selective pressure to said working chamber through a three-way valve connected selectively to a source of vacuum and to a source of a pressurized medium.

12. A method as claimed in claim 11, wherein said pressurized medium comprises compressed air.

13. A method as claimed in claim 11, wherein said pressurized medium comprises a hydraulic fluid.

14. A method as claimed in claim 11, comprising maintaining said first valve in an open fluid flow condition and said second valve in a fluid flow blocking condition when said working chamber is subjected to a vacuum by said three-way valve for aspirating said quantity of fluid from said fluid supply into said diaphragm pump.

15. A method as claimed in claim 11, comprising maintaining said first valve in a fluid flow blocking condition and said second valve in an open fluid flow condition when said working chamber is subjected to superatmospheric pressure by said three-way valve to eject a predetermined quantity of fluid from said nozzle and to cause the formation of said flow-occluding air bubble in said nozzle.

* * * * *

UNITED STATES PATENT AND TRADEMARK OFFICE
CERTIFICATE OF CORRECTION

PATENT NO. : 4,863,066
DATED : September 5, 1989
INVENTOR(S) : Kenneth F. Uffenheimer, et al.

It is certified that error appears in the above-identified patent and that said Letters Patent is hereby corrected as shown below:

Column 5, line 28: "as" should read as --10--

Column 6, line 65: insert --Hereby, a $>$ A--

Column 7, line 21: "decrease" should read as --decreased--

Column 7, line 65: "$\nabla S = \alpha \pi A$" should read as --$\nabla S = \Delta \rho A$--

Signed and Sealed this

Second Day of October, 1990

Attest:

HARRY F. MANBECK, JR.

Attesting Officer

Commissioner of Patents and Trademarks